(12) United States Patent
Liu et al.

(10) Patent No.: US 9,526,101 B2
(45) Date of Patent: Dec. 20, 2016

(54) RADIO FREQUENCY TRANSMIT-RECEIVE APPARATUS, TERMINAL, AND METHOD

(71) Applicant: Huawei Technologies Co., Ltd., Shenzhen, Guangdong (CN)

(72) Inventors: Zhigang Liu, Beijing (CN); Shanqing Zeng, Shenzhen (CN); Shutian Yuan, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 124 days.

(21) Appl. No.: 14/476,321

(22) Filed: Sep. 3, 2014

(65) Prior Publication Data

US 2015/0009873 A1    Jan. 8, 2015

Related U.S. Application Data

(63) Continuation of application No. PCT/CN2014/076916, filed on May 7, 2014.

(30) Foreign Application Priority Data

May 30, 2013   (CN) .......................... 2013 1 0208479

(51) Int. Cl.
| | | |
|---|---|---|
| *H04W 72/04* | (2009.01) | |
| *H04L 5/14* | (2006.01) | |
| *H04B 1/00* | (2006.01) | |
| *H04B 1/52* | (2015.01) | |
| *H04W 8/22* | (2009.01) | |
| *H04W 72/02* | (2009.01) | |

(Continued)

(52) U.S. Cl.
CPC ....... *H04W 72/0446* (2013.01); *H04B 1/0057* (2013.01); *H04B 1/52* (2013.01); *H04L 5/14* (2013.01); *H04B 1/44* (2013.01); *H04B 7/0805* (2013.01); *H04W 8/22* (2013.01); *H04W 72/02* (2013.01)

(58) Field of Classification Search
CPC .... H04W 72/0446; H04W 8/22; H04W 88/00; H04W 88/02; H04W 88/06; H04L 5/14
USPC .................. 370/280, 310–350, 359, 419, 463
See application file for complete search history.

(56) References Cited

U.S. PATENT DOCUMENTS

| | | | |
|---|---|---|---|
| 7,583,934 B2 | 9/2009 | Fischer | |
| 2004/0033787 A1* | 2/2004 | Weber | ...................... H04B 7/04 455/78 |

(Continued)

FOREIGN PATENT DOCUMENTS

| | | |
|---|---|---|
| CN | 101047420 A | 10/2007 |
| CN | 102208940 A | 10/2011 |

(Continued)

*Primary Examiner* — Warner Wong
(74) *Attorney, Agent, or Firm* — Leydig, Voit & Mayer, Ltd.

(57) ABSTRACT

Embodiments of the present invention provide a radio frequency transmit-receive apparatus, a terminal, and a method. The radio frequency transmit-receive apparatus according to the present invention includes: a first antenna unit, a duplexer, a radio frequency unit, and a signal selecting unit. The embodiments of the present invention can solve a problem of inflexible uplink and downlink resource configuration in a radio frequency transmit-receive apparatus in the prior art.

11 Claims, 5 Drawing Sheets

(51) Int. Cl.
*H04B 1/44* (2006.01)
*H04B 7/08* (2006.01)

(56) References Cited

U.S. PATENT DOCUMENTS

| | | | | |
|---|---|---|---|---|
| 2004/0121753 | A1* | 6/2004 | Sugar | H04B 1/005 455/333 |
| 2004/0219959 | A1* | 11/2004 | Khayrallah | H04B 7/0871 455/575.7 |
| 2005/0227631 | A1* | 10/2005 | Robinett | H04B 1/006 455/83 |
| 2010/0142416 | A1* | 6/2010 | Kim | H04B 7/15557 370/281 |
| 2012/0013387 | A1* | 1/2012 | Sankaranarayanan | H03H 7/422 327/355 |
| 2012/0039229 | A1* | 2/2012 | Etemad | H04W 4/06 370/312 |
| 2012/0257524 | A1 | 10/2012 | Chen et al. | |
| 2012/0294299 | A1* | 11/2012 | Fernando | H04B 7/08 370/339 |
| 2012/0327821 | A1* | 12/2012 | Lin | H04W 72/048 370/280 |
| 2012/0327825 | A1* | 12/2012 | Gudem | H04B 1/3805 370/310 |
| 2013/0039229 | A1 | 2/2013 | Park et al. | |
| 2013/0051284 | A1* | 2/2013 | Khlat | H04L 5/00 370/277 |
| 2013/0230080 | A1* | 9/2013 | Gudem | H04B 1/0057 375/219 |

FOREIGN PATENT DOCUMENTS

| | | |
|---|---|---|
| CN | 102307067 A | 1/2012 |
| CN | 102958059 A | 3/2013 |
| CN | 102986286 A | 3/2013 |
| CN | 103338050 A | 10/2013 |
| DE | 10200048 A1 | 6/2003 |

\* cited by examiner

RADIO FREQUENCY TRANSMIT-RECEIVE APPARATUS, TERMINAL, AND METHOD

CROSS-REFERENCE TO RELATED APPLICATION

This application is a continuation of International Patent Application No. PCT/CN2014/076916, filed on May 7, 2014, which claims priority to Chinese Patent Application No. 201310208479.3, filed on May 30, 2013, both of which are hereby incorporated by reference in their entireties.

TECHNICAL FIELD

Embodiments of the present invention relate to radio communications technologies, and in particular, to a radio frequency transmit-receive apparatus, a terminal, and a method.

BACKGROUND

In Long Term Evolution (LTE) communications technology, duplex modes may be classified into two types, Frequency Division Duplex (FDD) and Time Division Duplex (TDD). In the FDD mode, different frequencies are used in uplink and downlink channels, and frames of fixed time lengths are used for both uplink transmission and downlink transmission. In the TDD mode, uplink transmission and downlink transmission are performed in different timeslots, and usually share a same frequency. Compared with FDD, TDD has characteristics of high frequency utilization and flexible uplink and downlink resource configuration.

A Carrier Aggregation (CA) technology is a key technology in LTE, and is used to implement aggregation of carriers at two frequencies. Generally, the CA technology may be implemented by using a radio frequency circuit of a terminal. According to different aggregation modes, CA may be classified into three types: intra-band contiguous CA, intra-band non-contiguous CA, and inter-band CA. Usually, the intra-band contiguous CA is applicable to a scenario of narrow frequency spacing, and a radio frequency circuit structure thereof is simple; the intra-band non-contiguous CA and inter-band CA are applicable to a scenario of wide frequency spacing. Since frequency resources vary across global communications markets, the CA technology is evolved with one of its focuses placed on promoting the capability of a radio frequency circuit to support wider frequency spacing.

In the prior art, in the TDD mode, two different bands in inter-band CA are both used to transmit uplink signals or both used to receive downlink signals in a TDD timeslot, and consequently, the uplink and downlink resource configurations are inflexible.

SUMMARY

Embodiments of the present invention provide a radio frequency transmit-receive apparatus, a terminal, and a method to overcome a problem of inflexible uplink and downlink resource configuration by a radio frequency transmit-receive apparatus in the prior art.

According to a first aspect, an embodiment of the present invention provides a radio frequency transmit-receive apparatus, including: a first antenna unit, configured to receive a first carrier aggregation signal, and input the first carrier aggregation signal to a duplexer;

the duplexer, configured to receive the first carrier aggregation signal input by the first antenna unit, and after dividing the first carrier aggregation signal into at least one first carrier signal, input each first carrier signal to a signal selecting unit corresponding to a frequency;

the signal selecting unit, configured to select to receive, in a time division duplex TDD timeslot, the at least one first carrier signal input by the duplexer, and input the at least one first carrier signal to a radio frequency unit; and the radio frequency unit, configured to receive the at least one first carrier signal sent by the signal selecting unit, and demodulate each of the at least one first carrier signal into a first analog baseband signal;

the radio frequency unit is further configured to modulate a second analog baseband signal into at least one second carrier signal, and send the at least one second carrier signal to the signal selecting unit corresponding to the frequency; the signal selecting unit is further configured to select to receive, in the TDD timeslot, the at least one second carrier signal sent by the radio frequency unit, and send the at least one second carrier signal to the duplexer; the duplexer is further configured to receive the at least one second carrier signal input by the signal selecting unit, combine the at least one second carrier signal to obtain a second carrier aggregation signal, and input the second carrier aggregation signal to the first antenna unit; and the first antenna unit is further configured to receive the second carrier aggregation signal sent by the duplexer, and transmit the second carrier aggregation signal.

In a first possible implementation of the first aspect, the apparatus further includes:

a controlling unit, configured to control, in the TDD timeslot according to a set ratio of uplink signal resources to downlink signal resources, the signal selecting unit to select to receive the at least one first carrier signal input by the duplexer and input the at least one first carrier signal to the radio frequency unit; or control the signal selecting unit to select to receive the at least one second carrier signal sent by the radio frequency unit and send the at least one second carrier signal to the duplexer.

According to the first possible implementation of the first aspect, in a second possible implementation, the signal selecting unit includes multiple signal selecting subunits, the radio frequency unit includes multiple radio frequency subunits, and each signal selecting subunit corresponds to one radio frequency subunit; and each signal selecting subunit is configured to select to receive, in the TDD timeslot, one of the at least one first carrier signal input by the duplexer, and input one of the at least one first carrier signal to a corresponding radio frequency subunit; and further configured to select to receive, in the TDD timeslot, one of the at least one second carrier signal sent by the corresponding radio frequency subunit, and send one of the at least one second carrier signal to the duplexer.

According to the second possible implementation of the first aspect, in a third possible implementation, the controlling unit is specifically configured to:

control, in the TDD timeslot according to the set ratio of uplink signal resources to downlink signal resources, a part of the multiple signal selecting subunits to select to receive the at least one first carrier signal input by the duplexer and input the at least one first carrier signal to the radio frequency unit, and control a part of the multiple signal selecting subunits to select to receive the at least one second carrier signal sent by the radio frequency unit and send the at least one second carrier signal to the duplexer.

According to the first aspect or any one of the first to third possible implementations of the first aspect, in a fourth possible implementation, the apparatus further includes a second antenna unit and at least one surface acoustic wave filter SAW unit, where:

the second antenna unit is configured to receive a third carrier aggregation signal, and input the third carrier aggregation signal to the at least one SAW unit;

the at least one SAW unit is configured to receive the third carrier aggregation signal input by the second antenna unit, and after dividing the third carrier aggregation signal into at least one third carrier signal, input the at least one third carrier signal to the radio frequency unit; and the radio frequency unit is further configured to receive the at least one third carrier signal input by the at least one SAW unit, and demodulate each of the at least one third carrier signal into a third analog baseband signal.

According to any one of the second to fourth possible implementations of the first aspect, in a fifth possible implementation, each signal selecting subunit further corresponds to a differential component; and each differential component is configured to receive one of the at least one first carrier signal input by a corresponding signal selecting subunit, and after converting one of the at least one first carrier signal into a differential signal, input the differential signal to a corresponding radio frequency subunit.

According to any one of the second to fifth possible implementation of the first aspect, in a sixth possible implementation, each signal selecting subunit further corresponds to a power amplifier; and each power amplifier is configured to receive one of the at least one second carrier signal input by the radio frequency unit, and after performing power amplification for one of the at least one second carrier signal, input one of the at least one second carrier signal to a corresponding signal selecting subunit.

According to the first aspect or any one of the first to sixth possible implementation of the first aspect, in a seventh possible implementation, the apparatus further includes a first single-pole N-throw (SPNT) switch, where the first SPNT switch is disposed between the first antenna unit and the duplexer, and configured to receive the first carrier aggregation signal sent by the first antenna unit, and input the first carrier aggregation signal to the duplexer; and further configured to receive the second carrier aggregation signal sent by the duplexer, and input the second carrier aggregation signal to the first antenna unit.

According to any one of the fourth to seventh possible implementations of the first aspect, in an eighth possible implementation, the apparatus further includes a second SPNT switch, where the second SPNT switch is disposed between the second antenna unit and the at least one SAW unit, and configured to receive the third carrier aggregation signal sent by the second antenna unit, and input the third carrier aggregation signal to the at least one SAW unit.

According to the first aspect or any one of the first to eighth possible implementations of the first aspect, in a ninth possible implementation, the duplexer is further configured to filter out a noise signal in the at least one second carrier signal and first carrier signal.

According to a second aspect, an embodiment of the present invention provides a terminal, including a baseband processor, and further including the radio frequency transmit-receive apparatus according to any embodiment of the present invention;

the radio frequency transmit-receive apparatus is configured to receive a first carrier aggregation signal, and after converting the first carrier aggregation signal into a first analog baseband signal, send the first analog baseband signal to the baseband processor; the baseband processor is configured to process the first analog baseband signal;

the baseband processor is further configured to generate a second analog baseband signal, and send the second analog baseband signal to the radio frequency transmit-receive apparatus; and the radio frequency transmit-receive apparatus is further configured to convert the second analog baseband signal into a second carrier aggregation signal for transmission.

According to a third aspect, an embodiment of the present invention provides a radio frequency transmit-receive method, including: selecting to receive, in a time division duplex TDD timeslot, a first carrier signal input by a duplexer, where the first carrier signal is obtained by the duplexer by dividing a first carrier aggregation signal input by a first antenna unit; and inputting the first carrier signal to a radio frequency unit, so that the radio frequency unit demodulates the first carrier signal into a first analog baseband signal; and selecting to receive, in the TDD timeslot, at least one second carrier signal sent by the radio frequency unit, and sending the at least one second carrier signal to the duplexer, so that the duplexer combines the at least one second carrier signal to obtain a second carrier aggregation signal and the first antenna unit transmits the second carrier aggregation signal.

In a first possible implementation of the third aspect, the selecting to receive, in a time division duplex TDD timeslot, a first carrier signal input by a duplexer, includes: selecting to receive, in the TDD timeslot according to a set ratio of uplink signal resources to downlink signal resources, the first carrier signal input by the duplexer; and the selecting to receive, in the TDD timeslot, at least one second carrier signal sent by the radio frequency unit, includes: selecting to receive, in the TDD timeslot according to the set ratio of uplink signal resources to downlink signal resources, the at least one second carrier signal sent by the radio frequency unit.

In the radio frequency transmit-receive apparatus, the terminal, and the method provided by the embodiments of the present invention, a duplexer, a signal selecting unit, and a radio frequency unit are used to constitute a signal transmission channel that may be used for both uplink transmission and downlink reception. The signal selecting unit may select to receive, in a TDD timeslot, a downlink first carrier signal, and may further select to transmit, in the TDD timeslot, an uplink second carrier signal, thereby achieving an objective of using a frequency band of the first carrier signal for downlink reception and using a frequency band of the second carrier signal for uplink transmission, implementing flexible configurations of uplink and downlink resources.

BRIEF DESCRIPTION OF DRAWINGS

To describe the technical solutions in the embodiments of the present invention or in the prior art more clearly, the following briefly introduces the accompanying drawings required for describing the embodiments or the prior art. Apparently, the accompanying drawings in the following description show some embodiments of the present invention, and persons of ordinary skill in the art may still derive other drawings from these accompanying drawings without creative efforts.

DESCRIPTION OF EMBODIMENTS

To make the objectives, technical solutions, and advantages of the embodiments of the present invention clearer, the following clearly describes the technical solutions in the embodiments of the present invention with reference to the accompanying drawings in the embodiments of the present invention. Apparently, the described embodiments are a part rather than all of the embodiments of the present invention. All other embodiments obtained by persons of ordinary skill in the art based on the embodiments of the present invention without creative efforts shall fall within the protection scope of the present invention.

Technologies described in this specification may be applied to various communications systems, for example, current 2G and 3G communications systems and a next-generation communications system, for example, a Global System for Mobile Communications (GSM), a Code Division Multiple Access (CDMA) system, a Time Division Multiple Access (TDMA) system, a Wideband Code Division Multiple Access (WCDMA) system, a Frequency Division Multiple Access (FDMA) system, an Orthogonal Frequency-Division Multiple Access (OFDMA system, a single-carrier FDMA (SC-FDMA) system, a General Packet Radio Service (GPRS) system, a LTE system, and other communications systems.

Figure 1:
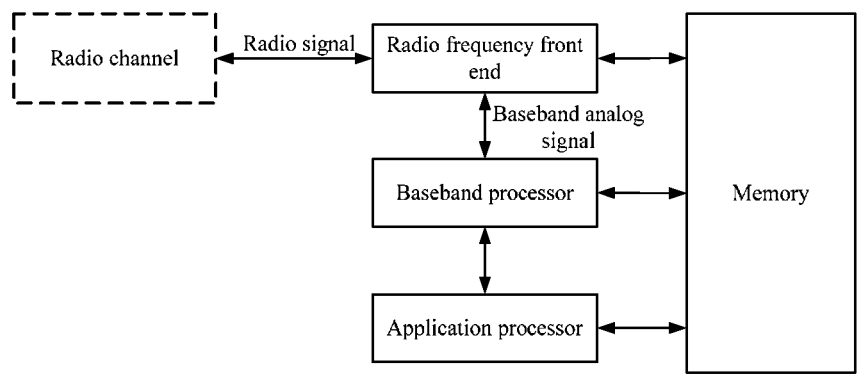
FIG. 1 is a typical schematic structural diagram of a circuit system of a terminal.

FIG. 1 is a typical schematic structural diagram of a circuit system of a terminal. As shown in FIG. 1, the circuit system of the terminal may include: a memory, an application processor, a baseband processor, and a radio frequency front end. The memory stores data and instructions required for running of each part of the system. The application processor runs an operating system and application programs of the terminal. The baseband processor processes baseband signals in radio communication. The radio frequency front end may receive a radio signal from a radio channel, and convert the radio signal into a baseband analog signal, and transmit the baseband analog signal to the baseband processor; the radio frequency front end may further receive a baseband analog signal from the baseband processor, convert the baseband analog signal into a radio signal, and transmit the radio signal to a radio channel.

A radio frequency transmit-receive apparatus provided by an embodiment of the present invention may implement radio frequency transmission and reception in all the foregoing types of communications systems, for example, in an LTE time division duplex TDD system in a case of inter-band carrier aggregation. The radio frequency transmit-receive apparatus may be disposed at the radio frequency front end in FIG. 1.

Figure 2:
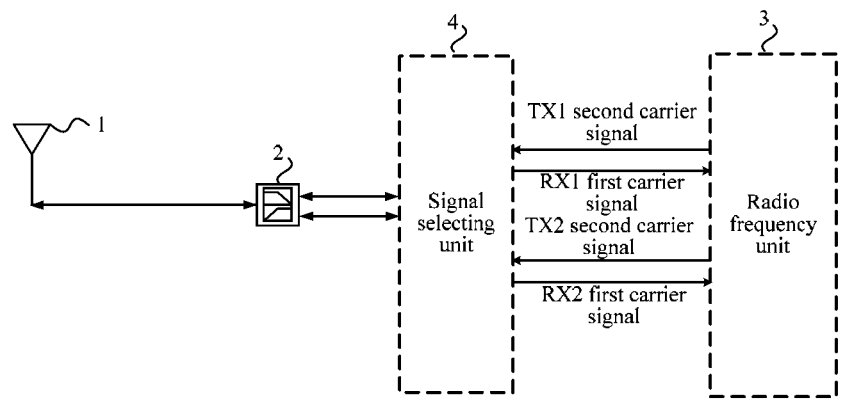
FIG. 2 is a schematic structural diagram of Embodiment 1 of a radio frequency transmit-receive apparatus according to the present invention.

FIG. 2 is a schematic structural diagram of Embodiment 1 of a radio frequency transmit-receive apparatus according to the present invention. As shown in FIG. 2, a radio frequency transmit-receive apparatus 200 in this embodiment may include: a first antenna unit 1, a duplexer 2, a radio frequency unit 3, and a signal selecting unit 4.

The first antenna unit 1 may be configured to receive a first carrier aggregation signal, and input the first carrier aggregation signal to the duplexer 2.

The duplexer 2 may be configured to receive the first carrier aggregation signal input by the first antenna unit 1, and after dividing the first carrier aggregation signal into at least one first carrier signal, input each first carrier signal to the signal selecting unit 4 corresponding to a frequency.

The signal selecting unit 4 may be configured to select to receive, in a TDD timeslot, the at least one first carrier signal input by the duplexer 2, and input the at least one first carrier signal to the radio frequency unit 3.

The radio frequency unit 3 may be configured to receive the at least one first carrier signal sent by the signal selecting unit 4, and demodulate each of the at least one first carrier signal into a first analog baseband signal.

The radio frequency unit 3 may be further configured to modulate a second analog baseband signal into at least one second carrier signal, and send the at least one second carrier signal to the signal selecting unit 4 corresponding to the frequency. The signal selecting unit 4 may be further configured to select to receive, in the TDD timeslot, the at least one second carrier signal sent by the radio frequency unit 3, and send the at least one second carrier signal to the duplexer 2. The duplexer 2 may be further configured to receive the at least one second carrier signal input by the signal selecting unit 4, combine the at least one second carrier signal to obtain a second carrier aggregation signal, and input the second carrier aggregation signal to the first antenna unit 1. The first antenna unit 1 may be further configured to receive the second carrier aggregation signal sent by the duplexer 2, and transmit the second carrier aggregation signal.

Each first carrier signal is a downlink signal, and each second carrier signal is an uplink signal. The radio frequency unit 3 may be configured to demodulate first carrier signals of multiple frequency bands, and may also be configured to generate second carrier signals of multiple frequency bands. In the example of FIG. 2, there are two first carrier signals RX1 and RX2 and two second carrier signals TX1 and TX2. In a specific implementation, the signal selecting unit 4 may, in a TDD timeslot, select to receive two downlink first carrier signals, or may select to transmit two uplink second carrier signals, and may further select to receive one first carrier signal and transmit one second carrier signal.

In the radio frequency transmit-receive apparatus in this embodiment, a duplexer, a signal selecting unit, and a radio frequency unit are used to constitute a signal transmission channel that may be used for both uplink transmission and downlink reception. The signal selecting unit may select to receive, in a TDD timeslot, a downlink first carrier signal, and may further select to transmit, in the TDD timeslot, an uplink second carrier signal, thereby achieving an objective of using a frequency band of the first carrier signal for downlink reception and using a frequency band of the second carrier signal for uplink transmission in one TDD timeslot, implementing flexible configurations of uplink and downlink resources.

Figure 3:
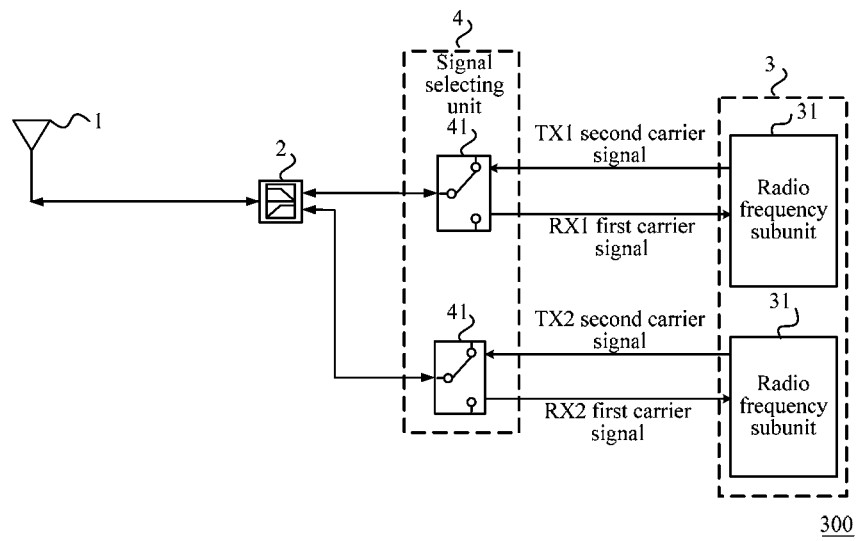
FIG. 3 is a schematic structural diagram of Embodiment 2 of a radio frequency transmit-receive apparatus according to the present invention.

FIG. 3 is a schematic structural diagram of Embodiment 2 of a radio frequency transmit-receive apparatus according to the present invention. As shown in FIG. 3, a radio frequency transmit-receive apparatus 300 in this embodiment is based on the embodiment shown in FIG. 2; in this embodiment, the signal selecting unit 4 may include multiple signal selecting subunits 41, the radio frequency unit 3 may include multiple radio frequency subunits 31, and each signal selecting subunit 41 corresponds to one radio frequency subunit 31, that is, each signal selecting subunit 41 corresponds to a carrier signal of one frequency.

Each signal selecting subunit 41 may be configured to select to receive, in a TDD timeslot, one of the at least one first carrier signal input by the duplexer 2, and input one of the at least one first carrier signal to a corresponding radio frequency subunit 31; and further configured to select to receive, in the TDD timeslot, one of the at least one second carrier signal sent by a corresponding radio frequency subunit 31, and send one of the at least one second carrier signal to the duplexer 2.

In a specific implementation, if a first carrier aggregation signal includes a signal of only one frequency, a signal output by the duplexer 2 is a first carrier signal, that is, the first carrier aggregation signal; if there is only one second carrier signal, a signal output after the second carrier signal is combined by the duplexer 2 is a second carrier aggregation signal, that is, the second carrier aggregation signal and the second carrier signal are a same signal.

In the example of the radio frequency transmit-receive apparatus in this embodiment, the signal selecting unit 4 includes two signal selecting subunits 41 and the radio frequency unit 3 includes two radio frequency subunits 31. Each radio frequency subunit 31 may be configured to provide a carrier signal of one frequency band. In a same TDD timeslot, each radio frequency subunit 31 may generate an uplink carrier signal of one frequency or process a downlink carrier signal. Carrier signals processed by the radio frequency subunits 31 may be carrier signals of different frequency bands. It is understandable that, in the signal selecting unit 4 in the radio frequency transmit-receive apparatus provided by this embodiment of the present invention, three or more than three signal selecting subunits 41 may be disposed to implement reception or transmission of carrier aggregation signals at three or more than three frequencies.

The duplexer 2 may combine multiple carrier signals of different frequencies into one signal, and may also divide one signal, which is obtained by aggregating carrier signals of multiple frequencies, into multiple single-carrier signals. Therefore, by using the radio frequency transmit-receive apparatus in this embodiment, multiple uplink and downlink signal transmission channels are allowed, and the signal selecting unit 4 may be used to control whether to use the uplink signal transmission channels or the downlink signal transmission channels.

To make the description clearer, a radio frequency unit 3 disposed in the following manner is used as an example for description. In a same TDD timeslot, one radio frequency subunit 31 may provide an uplink carrier signal TX1, or may process a downlink carrier signal RX1; another radio frequency subunit 31 may generate an uplink carrier signal TX2, or may process a downlink carrier signal RX2. Furthermore, the uplink carrier signal TX1 generated by the one radio frequency subunit 31 and the uplink carrier signal TX2 generated by the another radio frequency subunit 31 are carrier signals of different frequency bands, and the downlink carrier signal RX1 processed by the one radio frequency subunit 31 and the downlink carrier signal RX2 processed by the another radio frequency subunit 31 are carrier signals of different frequency bands. However, usually, the uplink carrier signal TX1 generated by the radio frequency subunit 31 and the downlink carrier signal RX1 that may be processed by the radio frequency subunit 31 are carrier signals of a same frequency band, and for ease of description, the two signals are respectively named the uplink carrier signal TX1 of a first frequency band and the downlink carrier signal RX1 of the first frequency band; the uplink carrier signal TX2 generated by the another radio frequency subunit 31 and the downlink carrier signal RX2 that may be processed by the another radio frequency subunit 31 may also be carrier signals of a same frequency band, and for ease of description, the two signals are respectively named the uplink carrier signal TX2 of a second frequency band and the downlink carrier signal RX2 of the second frequency band.

The duplexer 2 may be a duplexer configured to combine two signals into one signal or divide one signal into two signals.

Correspondingly, the number of signal selecting subunits 41 may also be set to two, so that each signal selecting subunit may collaborate with one radio frequency subunit 31. In this design, the radio frequency transmit-receive apparatus in this embodiment may implement four signal transmission channels, namely, two uplink signal channels and two downlink signal channels. The one radio frequency subunit 31, one signal selecting subunit 41, the duplexer 2, and the antenna unit 1 constitute a first uplink channel and a first downlink channel, which are respectively used to transmit the uplink carrier signal TX1 of the first frequency band and the downlink carrier signal RX1 of the first frequency band. The another radio frequency subunit 31, another signal selecting subunit 41, the duplexer 2, and the antenna unit 1 constitute a second uplink channel and a second downlink channel, which are respectively used to transmit the uplink carrier signal TX2 of the second frequency band and the downlink carrier signal RX2 of the second frequency band. Each signal selecting subunit 41 may be a single-pole double-throw switch. In a same TDD timeslot, the one SPNT switch is configured to select the first uplink channel or the first downlink channel to be in a working state, and the other single-pole double-throw switch is configured to select the second uplink channel or the second downlink channel to be in a working state.

Specifically, a process of transmitting the downlink carrier signal RX1 of the first frequency band on the first downlink channel may be as follows:

the duplexer 2 may be in a working mode of one single-end signal input and two single-end signal outputs, or the duplexer 2 may be in a working mode of an input and output at one end in a case of one signal and one signal output and one signal input at one end in a case of two signals. Therefore, the first antenna unit 1 receives a first carrier aggregation signal, and after the first carrier aggregation signal passes through the duplexer 2, a first carrier signal is obtained, where the first carrier signal is the downlink carrier signal RX1 of the first frequency band, and the first carrier signal is sent to a signal selecting subunit 41 corresponding to the first frequency band. The signal selecting subunit 41 corresponding to the RX1 is set to work in a downlink channel state, and inputs the first carrier signal, that is, the downlink carrier signal RX1 of the first frequency band, to a radio frequency subunit 31 that can process the signal of the first frequency band.

A process of transmitting the uplink carrier signal TX1 of the first frequency band on the first uplink channel may be as follows:

the duplexer 2 may be in a working mode of one single-end signal output and two single-end signal inputs, or the duplexer 2 may be in a working mode of an input and output at one end in a case of one signal and one signal output and one signal input at one end in a case of two signals; and the signal selecting unit 4 corresponding to the first frequency band is set to work in an uplink channel state. A radio frequency subunit 31 that can generate the uplink carrier signal TX1 of the first frequency band sends the generated uplink carrier signal TX1 of the first frequency band as a second carrier signal to the signal selecting subunit 41 corresponding to the first frequency band. The signal selecting subunit 41 corresponding to the first frequency band then sends the second carrier signal, that is, the uplink carrier signal TX2 of the first frequency band, to an input port among two signal input ports of the duplexer 2, and the second carrier signal is output to the first antenna unit 1 from an output end of the duplexer 2.

A process of transmitting the downlink carrier signal RX2 of the second frequency band on the second downlink channel may be as follows:

the duplexer 2 may be set to a working mode of one single-end signal input and two single-end signal outputs, or the duplexer 2 may be set to a working mode of an input and output at one end in a case of one signal and one signal output and one signal input at one end in a case of two signals. The first antenna unit 1 receives a radio frequency aggregation signal. After the radio frequency aggregation signal passes through the duplexer 2, a first carrier signal, that is, the downlink carrier signal RX2 of the second frequency band is obtained, and the first carrier signal is sent to a signal selecting subunit 41 corresponding to the second frequency band. The signal selecting subunit 41 corresponding to the second frequency band is set to work in a downlink channel state, and inputs the first carrier signal to a radio frequency subunit 31 that can process the downlink carrier signal RX2 of the second frequency band.

A process of transmitting the uplink carrier signal TX2 of the second frequency band on the second uplink channel may be as follows:

the duplexer 2 may be set to a working mode of one single-end signal output and two single-end signal inputs, or the duplexer 2 may be set to a working mode of an input and output at one end in a case of one signal and one signal output and one signal input at one end in a case of two signals; and a signal selecting subunit 41 corresponding to the TX2 is set to work in an uplink channel state. A radio frequency subunit 31 that can generate the uplink carrier signal TX2 of the second frequency band sends the generated uplink carrier signal TX2 of the second frequency band as a second carrier signal to the signal selecting subunit 41 corresponding to the second frequency band. The signal selecting subunit 41 corresponding to the second frequency band then sends the second carrier signal to an input port among the two signal input ports of the duplexer 2, and the second carrier signal is output to the first antenna unit 1 from an output end of the duplexer 2.

The four signal transmission channels in this embodiment may be combined flexibly. In a same TDD timeslot, either one of the first downlink channel and the first uplink channel may be selected as a working signal transmission channel, and either one of the second downlink channel and the second uplink channel may be selected as a working signal transmission channel That is, in a same TDD timeslot, the four signal transmission channels may be combined into the following four working modes: the first downlink channel and the second downlink channel (both used to transmit a first carrier aggregation signal and two first carrier signals), the first uplink channel and the second uplink channel (both used to transmit two second carrier signals and a second carrier aggregation signal), the first downlink channel and the second uplink channel (used to transmit a first carrier aggregation signal, a second carrier aggregation signal, a first carrier signal, and a second carrier signal), and the first uplink channel and the second downlink channel (used to transmit a first carrier aggregation signal, a second carrier aggregation signal, a first carrier signal, and a second carrier signal).

In this embodiment, by using the foregoing signal transmission channels that can be combined flexibly, signals of multiple different frequency bands may all be used for downlink reception or may all be used uplink transmission, or signals of any frequency band therein are used for uplink transmission, and signals of other frequency bands are used for downlink reception. Thereby, uplink and downlink resources may be configured flexibly.

Figure 4:
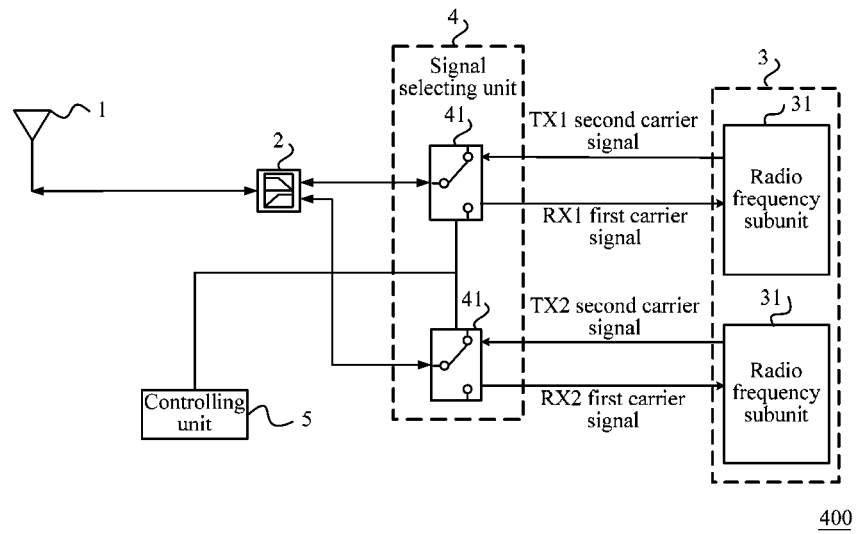
FIG. 4 is a schematic structural diagram of Embodiment 3 of a radio frequency transmit-receive apparatus according to the present invention.

FIG. 4 is a schematic structural diagram of Embodiment 3 of a radio frequency transmit-receive apparatus according to the present invention. As shown in FIG. 4, a radio frequency transmit-receive apparatus 400 in this embodiment, which is based on the embodiment of the radio frequency transmit-receive apparatus shown in FIG. 3, may further include:

a controlling unit 5, where the controlling unit 5 may be configured to control, in a TDD timeslot according to a set ratio of uplink signal resources to downlink signal resources, a part of the multiple signal selecting subunits 41 of the signal selecting unit 4 to select to receive the at least one first carrier signal input by the duplexer 2 and input the at least one first carrier signal to the radio frequency unit 3; or control a part of the multiple signal selecting subunits 41 of the signal selecting unit 4 to select to receive the at least one second carrier signal sent by the radio frequency unit 3 and send the at least one second carrier signal to the duplexer 2.

In a feasible implementation, the controlling unit 5 may be further configured to control, in a TDD timeslot, all the signal selecting subunits 41 to select to receive the at least one first carrier signal input by the duplexer 2 and input the at least one first carrier signal to the radio frequency unit 3, or control all the signal selecting subunits 41 to select to receive the at least one second carrier signal sent by the radio frequency unit 3 and send the at least one second carrier signal to the duplexer 2.

That is, the apparatus in this embodiment may be set to use, in a TDD timeslot, all the signal transmission channels for uplink transmission or downlink reception, or may be set to use, in a TDD timeslot, a part of the signal transmission channels for uplink transmission and a part of the signal transmission channels for downlink reception.

In an actual application, the controlling unit 5 may be further configured to configure the radio frequency unit 3, so that the radio frequency unit 3 enables, according to the set ratio of uplink signal resources to downlink signal resources, each radio frequency subunit 31 to work in a corresponding frequency band.

In a specific implementation, the controlling unit 5 may be integrated into the baseband processor shown in FIG. 1.

In this embodiment, there are four signal transmission channels same as those in the embodiment shown in FIG. 3, and the controlling unit 5 controls the signal selecting unit 4, to make it flexible and convenient to perform uplink and downlink resource configuration. A working process of the radio frequency transmit-receive apparatus in this embodiment will be described in detail, based on the example in which the radio frequency unit 3 includes two radio frequency subunits 31 respectively corresponding to two frequency bands and the signal selecting unit 4 includes two signal selecting subunits 41 respectively corresponding to two frequency bands.

For example, to meet a 1:1 ratio of uplink to downlink resources, two TDD timeslots may be used as a transmission and reception period. An implementation method is as follows:

In a first TDD timeslot, the controlling unit 5 may be used to control the two signal selecting subunits 41 to work in an uplink channel state, that is, the first TDD timeslot is used as two uplink resources. A specific working process is as follows: The two radio frequency subunits 31 respectively modulate two second analog baseband signals into two second carrier signals TX1 and TX2, and respectively send the two second carrier signals to the two signal selecting subunits 41 of corresponding frequencies; the two signal selecting subunits 41 select to receive the two second carrier signals TX1 and TX2 sent by the two radio frequency subunits 31, and send the two second carrier signals TX1 and TX2 to the duplexer 2; the duplexer 2 receives the two second carrier signals TX1 and TX2 input by the two signal selecting subunits 41, combines the two second carrier signals TX1 and TX2 to obtain a second carrier aggregation signal TX1+TX2, and inputs the second carrier aggregation signal to the first antenna unit 1, and the first antenna unit 1 transmits the second carrier aggregation signal to a radio channel.

In a second TDD timeslot, the controlling unit 5 may be used to control the two signal selecting subunits 41 to work in a downlink channel state, that is, the second TDD timeslot is used as two downlink resources. A specific working process is as follows: The first antenna unit 1 receives a first carrier aggregation signal RX1+RX2, and inputs the first carrier aggregation signal to the duplexer 2; the duplexer 2 receives the first carrier aggregation signal input by the first antenna unit 1, and after dividing the first carrier aggregation signal into two first carrier signals RX1 and RX2 of different frequencies, inputs the carrier signals RX1 and RX2 to the two signal selecting subunits 41 of corresponding frequencies; the two signal selecting subunits 41 select to respectively receive the two first carrier signals RX1 and RX2 input by the duplexer 2, and respectively input the two first carrier signals RX1 and RX2 to the two radio frequency subunits 31 of the corresponding frequencies; and the two radio frequency subunits 31 respectively receive the two first carrier signals RX1 and RX2 of the corresponding frequencies, and respectively demodulate the two first carrier signals RX1 and RX2 into two first analog baseband signals.

In this way, the 1:1 ratio of uplink to downlink resources is met. In a specific implementation, the first TDD timeslot may also be used as two downlink resources, and the second TDD timeslot may also be used as two uplink resources; or more timeslots may be used as a transmission and reception period; for example, four TDD timeslots are used as a transmission and reception period, and the first two TDD timeslots are used as downlink resources, and the last two TDD timeslots are used as uplink resources; or each TDD timeslot may be used as an uplink resource and a downlink resource, and so on. The present invention sets no limitation thereto.

For another example, to meet a 1:3 ratio of uplink to downlink resources, two TDD timeslots may still be used as a transmission and reception period. An implementation method is as follows:

In a first TDD timeslot, the controlling unit 5 may be used to control one of the signal selecting subunits 41 to work in an uplink channel state, and control the other signal selecting subunit 41 to work in a downlink channel state, that is, the first TDD timeslot is used as an uplink resource and a downlink resource. A specific working process is as follows:

A radio frequency subunit 31 corresponding to the signal selecting subunit 41 that works in the uplink channel modulates a second analog baseband signal into a second carrier signal TX1, and sends the second carrier signal TX1 to a signal selecting subunit 41 corresponding to a frequency; the signal selecting subunit 41 selects to receive the second carrier signal TX1 sent by the radio frequency subunit 31, and sends the second carrier signal TX1 to the duplexer 2; and the duplexer 2 receives the second carrier signal TX1, and inputs the second carrier signal TX1 to the first antenna unit 1, and the first antenna unit 1 transmits the second carrier signal TX1 to a radio channel.

The first antenna unit 1 receives a radio frequency signal RX2, and inputs the radio frequency signal RX2 to the duplexer 2; the duplexer 2 inputs the radio frequency signal RX2 to a signal selecting subunit 41 that corresponds to a frequency and works in the downlink channel; the signal selecting subunit 41 selects to receive the radio frequency signal RX2 input by the duplexer 2, and inputs the radio frequency signal RX2 to a radio frequency subunit 31 corresponding to a frequency; and the radio frequency subunit 31 demodulates the radio frequency signal RX2 into a first analog baseband signal.

In this way, an uplink resource and a downlink resource are included in the first TDD timeslot.

In a second TDD timeslot, the controlling unit 5 may be used to control the two signal selecting subunits 41 to work in a downlink channel state, that is, the second TDD timeslot is used as two downlink resources. A specific working process is as follows: The first antenna unit 1 receives a first carrier aggregation signal RX1+RX2, and inputs the first carrier aggregation signal to the duplexer 2; the duplexer 2 receives the first carrier aggregation signal input by the first antenna unit 1, and after dividing the first carrier aggregation signal into two first carrier signals RX1 and RX2 of different frequencies, inputs the carrier signals to the two signal selecting subunits 41 of corresponding frequencies; the two signal selecting subunits 41 select to respectively receive the two first carrier signals RX1 and RX2 input by the duplexer 2, and respectively input the two first carrier signals RX1 and RX2 to the two radio frequency subunits 31 of the corresponding frequencies; and the two radio frequency subunits 31 respectively receive the two first carrier signals RX1 and RX2 of the corresponding frequencies, and respectively demodulate the two first carrier signals RX1 and RX2 into two first analog baseband signals.

In this way, two downlink resources are included in the second TDD timeslot.

One uplink resource and three downlink resources are included in the two TDD timeslots, that is, the 1:3 ratio of uplink to downlink resources is met.

By analogy, by using the controlling unit 5 to control the signal selecting unit, a ratio of uplink signal resources to downlink signal resources in each timeslot may be set, and by using a combination of multiple timeslots, the radio frequency transmit-receive apparatus according to the present invention may realize any ratio of uplink to downlink resources.

Further, in the foregoing embodiment, the duplexer 2 may be further configured to filter out noise signals outside the bands in which the at least one second carrier signal and first carrier signal are located. Specifically, when combining the two input second carrier signals into one second carrier aggregation signal for outputting, the duplexer 2 further filters spurious noise signals outside the bands of the two second carrier signals; and when dividing one input first carrier aggregation signal into two first carrier signals for outputting, the duplexer 2 further filters out spurious noise signals outside the bands of the two first carrier signals.

Figure 5:
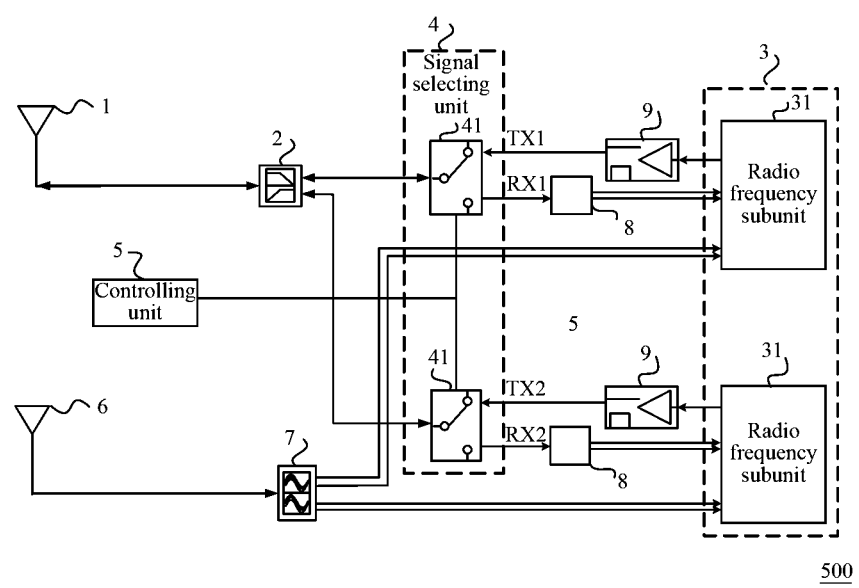
FIG. 5 is a schematic structural diagram of Embodiment 4 of a radio frequency transmit-receive apparatus according to the present invention.

FIG. 5 is a schematic structural diagram of Embodiment 4 of a radio frequency transmit-receive apparatus according to the present invention. As shown in FIG. 5, a radio frequency transmit-receive apparatus 500 in this embodiment, which is based on the embodiment of the radio frequency transmit-receive apparatus shown in FIG. 4, may further include a second antenna unit 6 and at least one surface acoustic wave filter (SAW) unit 7.

The second antenna unit 6 may be configured to receive a third carrier aggregation signal, and input the third carrier aggregation signal to the at least one SAW unit 7.

The at least one SAW unit 7 may be configured to receive the third carrier aggregation signal input by the second antenna unit, and after dividing the third carrier aggregation signal into at least one third carrier signal, input the at least one third carrier signal to the radio frequency unit 3. Specifically, when the third carrier aggregation signal includes a signal of only one frequency band, the at least one SAW unit 7 outputs one third carrier signal; and when the third carrier aggregation signal includes signals of two frequency bands, the at least one SAW unit 7 outputs two third carrier signals.

The radio frequency unit 3 may be further configured to receive the at least one third carrier signal input by the at least one SAW unit, and demodulate each of the at least one third carrier signal into a third analog baseband signal.

It should be noted that the second antenna unit 6 and the first antenna unit 1 receive a same signal, that is, the third carrier aggregation signal and the first carrier aggregation signal are actually a same signal. A receive status of the second antenna unit 6 keeps consistent with that of the first antenna unit 1. For example, if the first antenna receives a signal of frequency band a, the second antenna also receives the signal of frequency band a; if the first antenna receives CA signals of frequency bands a and b, the second antenna also receives CA signals of frequency bands a and b.

Specifically, the second antenna unit 6, the SAW unit 7, and the radio frequency unit 3 constitute a downlink channel used to receive the third carrier aggregation signal. The downlink channel may be used as a backup of the downlink channel in the foregoing embodiments, and may enhance strength of the second carrier aggregation signal received by the radio frequency transmit-receive apparatus and improve reception performance. Usually the first antenna unit 1 may be called a main antenna, and the second antenna unit 6 may be called a diversity antenna.

In the radio frequency unit 3, there may be two radio frequency subunits 31 respectively corresponding to carrier signals of two different frequency bands. Correspondingly, each of the at least one SAW unit 7 may include two filters respectively corresponding to the two frequency bands, where the filters are configured to select two third carrier signals of respective bands from one input third carrier aggregation signal. Furthermore, if an input port of a radio frequency subunit 31 in the radio frequency unit 3 is a differential port, an output port of the SAW unit 7 may be set as a differential port, that is, when the third carrier aggregation signal is divided into at least one third carrier signal of different frequencies, each third carrier signal is converted into a differential signal and then output to the corresponding radio frequency subunit 31.

Further, each signal selecting subunit 41 of the signal selecting unit 4 may further correspond to a differential component 8.

Each differential component 8 may be configured to receive one the at least one first carrier signal input by a corresponding signal selecting subunit 41, and after converting one of the at least one first carrier signal into a differential signal, input the differential signal to a corresponding radio frequency subunit 31 in the radio frequency unit 3.

The use of differential component 8 is to satisfy a scenario in which a radio frequency input interface of the radio frequency unit 3 is a differential interface. If the radio frequency input interface of the radio frequency unit 3 is a single-end interface, no differential component needs to be disposed.

Further, each signal selecting unit 4 further corresponds to a power amplifier 9.

Each power amplifier 9 may be configured to receive one of the at least one second carrier signal input by the radio frequency unit 3, and after performing power amplification for one of the at least one second carrier signal, input one of the at least one second carrier signal to a corresponding signal selecting subunit 41.

The use of power amplifier 9 is driven by the concern that the at least one second carrier signal generated by the radio frequency unit 3 usually has low power. To ensure communication quality, the second carrier signal generated by each radio frequency subunit 31 in the radio frequency unit 3 needs to be amplified by the power amplifier 9 before it is input to a corresponding signal selecting subunit 41.

In this embodiment, a second antenna unit receives a third carrier aggregation signal; an SAW unit performs wave filtering and frequency selection, divides the second carrier aggregation signal into third carrier signals of various frequency bands, and then inputs these third carrier signals to a radio frequency unit corresponding to a frequency band. In this way, an additional downlink channel is provided, and strength of a downlink signal is enhanced, which ensures reception performance.

Figure 6:
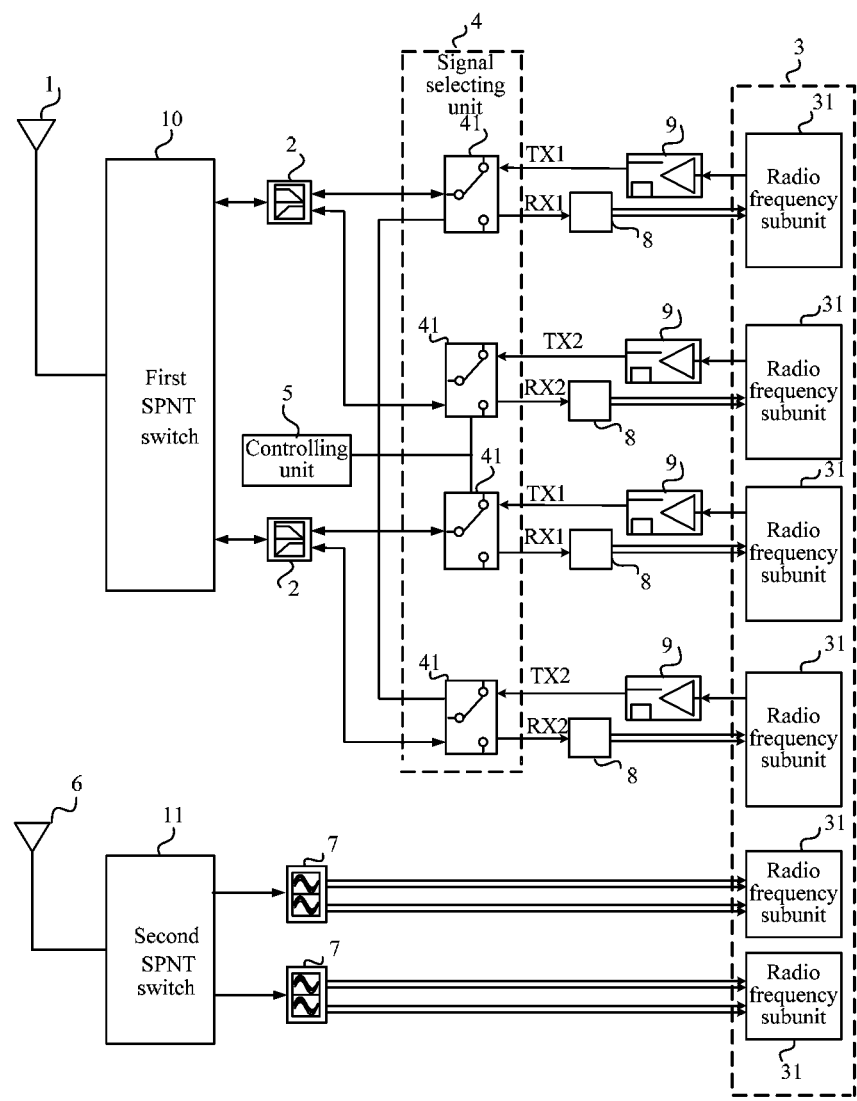
FIG. 6 is a schematic structural diagram of Embodiment 5 of a radio frequency transmit-receive apparatus according to the present invention.

FIG. 6 is a schematic structural diagram of Embodiment 5 of a radio frequency transmit-receive apparatus according to the present invention. As shown in FIG. 6, a radio frequency transmit-receive apparatus 600 in this embodiment, which is based on the embodiment of the radio frequency transmit-receive apparatus shown in FIG. 5, may further include: a first single-pole N-throw (SPNT) switch 10, where the first SPNT switch 10 is disposed between the first antenna unit 1 and the duplexer 2, and may be configured to receive the first carrier aggregation signal sent by the first antenna unit 1, and input the first carrier aggregation signal to the duplexer 2; and may be further configured to receive the second carrier aggregation signal sent by the duplexer 2, and input the second carrier aggregation signal to the first antenna unit 1.

It should be noted that there may be two or more than two duplexers, where each duplexer 2 may correspond to at least two signal selecting subunits 41. Alternatively, only one duplexer may be used. For example, the duplexer 2 is used to implement aggregation of two carrier signals and if a single-carrier signal transmission channel needs to be additionally provided, the first SPNT switch 10 may also be used to select a transmission channel corresponding to the duplexer or a single-carrier signal transmission channel.

Specifically, a primary function of the first SPNT switch 10 is to select a duplexer from multiple duplexers 2, so that a transmission channel corresponding to the selected duplexer 2 is in a working state. Therefore, a single-pole N-throw switch may be used as the first SPNT switch 10. Usually, two ports of each duplexer 2 may be respectively used for transmission of carrier signals of one frequency band, but each power amplifier 9 usually supports carrier signals of only one frequency band. Therefore, multiple duplexers 2 and multiple power amplifiers 9 may be used to constitute multiple transmission channels, and the first SPNT switch 10 makes flexible selection among the multiple transmission channels, which therefore may satisfy a requirement of a user or an operator on various frequency bands of the radio frequency transmit-receive apparatus.

Further, the apparatus may further include a second SPNT switch 11, where the second SPNT switch 11 is disposed between the second antenna unit 6 and each SAW unit 7, and configured to receive the third carrier aggregation signal sent by the second antenna unit 6, and input the third carrier aggregation signal to the SAW unit 7.

There may be multiple SAW units. Each SAW unit 7 usually can perform wave filtering and frequency selection for signals of two frequency bands. Therefore, by using multiple SAW units 7 and using the second SPNT switch 11 to make selection for carrier signals of different frequency bands corresponding to the multiple SAW units 7, a requirement of a user or operator on various frequency bands of the radio frequency transmit-receive apparatus may be satisfied.

In a specific implementation, the first SPNT switch 10 and the second SPNT switch 11 may also be controlled by a controlling unit 5.

It should be noted that in FIG. 6, to describe a connection relationship between each component more clearly, multiple radio frequency subunits 31 are illustrated. However, in an actual implementation, because radio frequency signals of only two frequency bands are required in a same timeslot, only two radio frequency subunits 31 may be actually used, and they work in corresponding frequency bands according to different band requirements.

Apparently, if it is necessary to implement carrier aggregation of more different frequency bands, a corresponding number of radio frequency subunits 31 need to be used. For example, three radio frequency subunits 31 may be used to implement carrier aggregation of three different frequency bands.

In this embodiment, multiple duplexers and transmission channels corresponding to the duplexers are disposed, and a first SPNT switch makes flexible selection among various transmission channels, so that the radio frequency transmit-receive apparatus in this embodiment may support carrier signals of more frequency bands.

Figure 7:
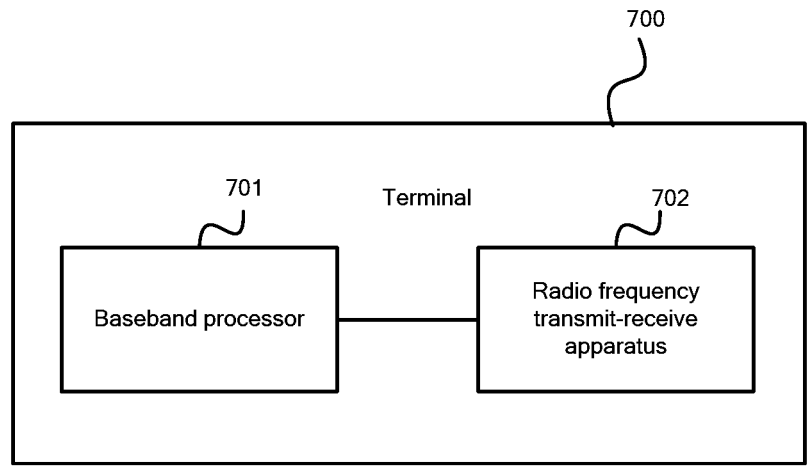
FIG. 7 is a schematic structural diagram of Embodiment 1 of a terminal according to the present invention.

FIG. 7 is a schematic structural diagram of Embodiment 1 of a terminal according to the present invention. As shown in FIG. 7, a terminal 700 in this embodiment may include a baseband processor 701, and further include the radio frequency transmit-receive apparatus 702 according to any embodiment of the radio frequency transmit-receive apparatus in the present invention.

The radio frequency transmit-receive apparatus 702 is configured to receive a first carrier aggregation signal, and after converting the first carrier aggregation signal into a first analog baseband signal, send the first analog baseband signal to the baseband processor 701; and the baseband processor 701 is configured to process the first analog baseband signal.

The baseband processor 701 is further configured to generate a second analog baseband signal, and send the second analog baseband signal to the radio frequency transmit-receive apparatus 702; and the radio frequency transmit-receive apparatus 702 is further configured to convert the second analog baseband signal into a second carrier aggregation signal for transmission.

Due to the use of the radio frequency transmit-receive apparatus according to any one of the foregoing embodiments, the terminal in this embodiment may perform flexible configuration of uplink and downlink resources.

Figure 8:
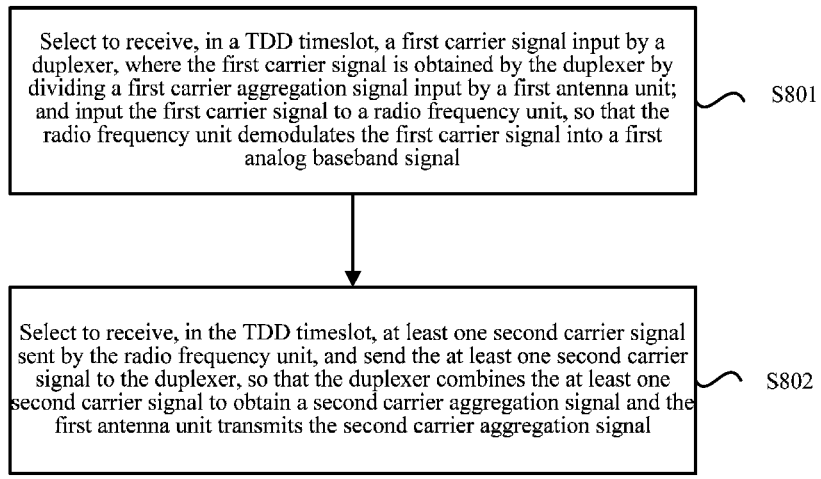
FIG. 8 is a flowchart of a radio frequency transmit-receive method according to an embodiment of the present invention.

FIG. 8 is a flowchart of a radio frequency transmit-receive method according to an embodiment of the present invention. This embodiment may be executed by a signal selecting unit in a radio frequency transmit-receive apparatus. The method specifically includes:

S801. Select to receive, in a TDD timeslot, a first carrier signal input by a duplexer, where the first carrier signal is obtained by the duplexer by dividing a first carrier aggregation signal input by a first antenna unit; and input the first carrier signal to a radio frequency unit, so that the radio frequency unit demodulates the first carrier signal into a first analog baseband signal.

S802. Select to receive, in the TDD timeslot, at least one second carrier signal sent by the radio frequency unit, and send the at least one second carrier signal to the duplexer, so that the duplexer combines the at least one second carrier signal to obtain a second carrier aggregation signal and the first antenna unit transmits the second carrier aggregation signal.

Further, in S801, the selecting to receive, in a TDD timeslot, a first carrier signal input by a duplexer, includes: selecting to receive, in the TDD timeslot according to a set ratio of uplink signal resources to downlink signal resources, the first carrier signal input by the duplexer; and correspondingly, in S802, the selecting to receive, in the TDD timeslot, at least one second carrier signal sent by the radio frequency unit, includes: selecting to receive, in the TDD timeslot according to the set ratio of uplink signal resources to downlink signal resources, the at least one second carrier signal sent by the radio frequency unit.

As may be known from the apparatus embodiment corresponding to FIG. 4, the controlling unit in the radio frequency transmit-receive apparatus may control, in the TDD timeslot according to the set resource configuration of uplink signals and downlink signals, the signal selecting unit to select to receive the first carrier signal input by the duplexer; and control, in the TDD timeslot, the signal selecting unit to select to receive the at least one second carrier signal sent by the radio frequency unit and send the at least one second carrier signal to the duplexer. For details, reference may be made to the embodiment corresponding to FIG. 4, and details are not described herein again.

In this embodiment, a signal selecting unit may select to receive, in a TDD timeslot, a downlink first carrier signal, and may further select to transmit, in the TDD timeslot, an uplink second carrier signal, thereby achieving an objective of using a frequency band of the first carrier signal for downlink reception and using a frequency band of the second carrier signal for uplink transmission, implementing flexible configuration of uplink and downlink resources.

Persons of ordinary skill in the art may understand that all or a part of the steps of the method embodiments may be implemented by a program instructing relevant hardware. The program may be stored in a computer readable storage medium. When the program runs, the steps of the method embodiments are performed. The foregoing storage medium includes any medium that can store program code, such as a ROM, a RAM, a magnetic disk, or an optical disc.

Finally, it should be noted that the foregoing embodiments are merely intended for describing the technical solutions of the present invention other than limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present invention.

What is claimed is:

1. A radio frequency transmit-receive apparatus, comprising:
    a first antenna unit, configured to receive a first carrier aggregation signal, and to input the first carrier aggregation signal to a duplexer;
    the duplexer, configured to receive the first carrier aggregation signal from the first antenna unit, to divide the first carrier aggregation signal into first carrier signals, and to input each of the first carrier signals to a signal selecting unit corresponding to a frequency band;
    the signal selecting unit, configured to select a first channel to receive, in a time division duplex (TDD) timeslot, the first carrier signals from the duplexer, and to input the first carrier signals to a radio frequency unit; and
    the radio frequency unit, configured to receive the first carrier signals from the signal selecting unit, and to demodulate each of the first carrier signals into a respective first analog baseband signal;
    wherein the radio frequency unit is further configured to modulate second analog baseband signals into respective second carrier signals, and to send the second carrier signals to the signal selecting unit;
    wherein the signal selecting unit is further configured to select a second channel to receive, in the TDD timeslot, the second carrier signals from the radio frequency unit, and to send the second carrier signals to the duplexer;
    wherein the duplexer is further configured to receive the second carrier signals from the signal selecting unit, to combine the second carrier signals to obtain a second carrier aggregation signal, and to input the second carrier aggregation signal to the first antenna unit;
    wherein the first antenna unit is further configured to receive the second carrier aggregation signal from the duplexer, and to transmit the second carrier aggregation signal; and
    wherein the apparatus further comprises;
    a control unit, configured to control, in the TDD timeslot according to a set ratio of uplink signal resources to downlink signal resources, the signal selecting unit to select the first channel to receive the first carrier signals and to input the first carrier signals to the radio frequency unit; and to control the signal selecting unit to select the second channel to receive the second carrier signals and to send the second carrier signals to the duplexer.

2. The apparatus according to claim 1, wherein the signal selecting unit comprises multiple signal selecting subunits, the radio frequency unit comprises multiple radio frequency subunits, and each signal selecting subunit corresponds to one radio frequency subunit; and
    wherein each signal selecting subunit is configured to select the first channel to receive, in the TDD timeslot, one of the first carrier signals from the duplexer, and to input the one of the first carrier signals to a corresponding radio frequency subunit; and further configured to select the second channel to receive, in the TDD timeslot, one of the second carrier signals from a corresponding radio frequency subunit, and to send the one of the second carrier signals to the duplexer.

3. The apparatus according to claim 2, wherein the control unit is further configured to:
    control, in the TDD timeslot according to the set ratio of uplink signal resources to downlink signal resources, a part of the multiple signal selecting subunits to select the first channel to receive the first carrier signals from the duplexer and to input the first carrier signals to the radio frequency unit, and to control a part of the multiple signal selecting subunits to select the second channel to receive the second carrier signals from the radio frequency unit and to send the second carrier signals to the duplexer.

4. The apparatus according to claim 1, further comprising a second antenna unit and at least one surface acoustic wave filter (SAW) unit, wherein:
    the second antenna unit is configured to receive a third carrier aggregation signal, and to input the third carrier aggregation signal to the at least one SAW unit;
    the at least one SAW unit is configured to receive the third carrier aggregation signal from the second antenna unit, to divide the third carrier aggregation signal into third carrier signals, and to input the third carrier signals to the radio frequency unit; and
    the radio frequency unit is further configured to receive the third carrier signals from the at least one SAW unit, and to demodulate each of the third carrier signals into a respective third analog baseband signal.

5. The apparatus according to claim 2, wherein the multiple signal selecting subunits include a signal selecting subunit corresponding to a differential component; and
    wherein the differential component is configured to receive one of the first carrier signals from the corresponding signal selecting subunit, to convert the one of the first carrier signals into a differential signal, and to input the differential signal to a corresponding radio frequency subunit.

6. The apparatus according to claim 2, wherein the multiple signal selecting subunits include a signal selecting subunit corresponding to a power amplifier; and
    wherein the power amplifier is configured to receive one of the second carrier signals from a corresponding radio frequency subunit, to perform power amplification for the one of the second carrier signals, and to input the power-amplified one of the second carrier signals to the signal selecting subunit corresponding to the power amplifier.

7. The apparatus according to claim 4, further comprising:
    a single-pole N-throw (SPNT) switch, disposed between the first antenna unit and the duplexer, configured to receive the first carrier aggregation signal from the first antenna unit, to input the first carrier aggregation signal to the duplexer, to receive the second carrier aggregation signal from the duplexer, and to input the second carrier aggregation signal to the first antenna unit.

8. The apparatus according to claim 4, further comprising: a single-pole N-throw (SPNT) switch, disposed between the second antenna unit and the at least one SAW unit, configured to receive the third carrier aggregation signal from the second antenna unit, and to input the third carrier aggregation signal to the at least one SAW unit.

9. The apparatus according to claim 1, wherein the duplexer is further configured to filter out noise signals outside one or more bands in which the second carrier signals and first carrier signals are located.

10. A terminal, comprising a baseband processor and a radio frequency transmit-receive apparatus, wherein:
the radio frequency transmit-receive apparatus is configured to receive a first carrier aggregation signal, to convert the first carrier aggregation signal into a first analog baseband signal, and to send the first analog baseband signal to the baseband processor;
the baseband processor is configured to process the first analog baseband signal;
the baseband processor is further configured to generate a second analog baseband signal, and to send the second analog baseband signal to the radio frequency transmit-receive apparatus; and
the radio frequency transmit-receive apparatus is further configured to convert the second analog baseband signal into a second carrier aggregation signal for transmission;
the radio frequency transmit-receive apparatus comprises:
a first antenna unit, configured to receive the first carrier aggregation signal, and to input the first carrier aggregation signal to a duplexer;
the duplexer, configured to receive the first carrier aggregation signal from the first antenna unit, to divide the first carrier aggregation signal into first carrier signals, and to input each of the first carrier signals to a signal selecting unit corresponding to a frequency band;
the signal selecting unit, configured to select a first channel to receive, in a time division duplex (TDD) timeslot, the first carrier signals from the duplexer, and to input the first carrier signals to a radio frequency unit; and
the radio frequency unit, configured to receive the first carrier signals from the signal selecting unit, and to demodulate each of the first carrier signals into a respective first analog baseband signal;
wherein the radio frequency unit is further configured to modulate the second analog baseband signal into a second carrier signal, and to send the second carrier signal to the signal selecting unit;
wherein the signal selecting unit is further configured to select a second channel to receive, in the TDD timeslot, the second carrier signal from the radio frequency unit, and to send the second carrier signal to the duplexer;
wherein the duplexer is further configured to receive the second carrier signal from the signal selecting unit, to combine the second carrier signal with at least one other second carrier signal to obtain the second carrier aggregation signal, and to input the second carrier aggregation signal to the first antenna unit; and
wherein the first antenna unit is further configured to receive the second carrier aggregation signal from the duplexer, and transmit the second carrier aggregation signal.

11. A radio frequency transmit-receive method, comprising:
receiving, by a first antenna unit, a first carrier aggregation signal;
obtaining, by a duplexer, first carrier signals by dividing the first carrier aggregation signal;
selecting a first channel to receive, in a time division duplex (TDD) timeslot, the first carrier signals from the duplexer;
inputting the first carrier signals to a radio frequency unit;
demodulating, by the radio frequency unit, the first carrier signals into respective first analog baseband signals; and
selecting a second channel to receive, in the TDD timeslot, second carrier signals from the radio frequency unit;
sending the second carrier signals to the duplexer;
combining, by the duplexer, the second carrier signals to obtain a second carrier aggregation signal; and
transmitting, by the first antenna unit, the second carrier aggregation signal;
wherein selecting the first channel to receive the first carrier signals is based on a set ratio of uplink signal resources to downlink signal resources; and
wherein selecting the second channel to receive the second carrier signals is based on the set ratio of uplink signal resources to downlink signal resources.

* * * * *